(12) United States Patent
Terao et al.

(10) Patent No.: US 6,393,004 B1
(45) Date of Patent: May 21, 2002

(54) COMMUNICATION SCHEME USING CHECK PACKETS FOR GUARANTEEING DATA PACKET ORDER IN COMMUNICATION MEDIA EXCHANGE DURING COMMUNICATION

(75) Inventors: Kazuyuki Terao; Satoshi Ono, both of Tokyo (JP); Shin Miyakawa, Palo Alto, CA (US)

(73) Assignees: Nippon Telegraph and Telephone Corporation, Tokyo (JP); NTT Multimedia Communications Laboratories, Inc., Wilmington, DE (US)

( * ) Notice: Subject to any disclaimer, the term of this patent is extended or adjusted under 35 U.S.C. 154(b) by 0 days.

(21) Appl. No.: 09/160,521

(22) Filed: Sep. 24, 1998

(51) Int. Cl.[7] ................................................. H04Q 7/00
(52) U.S. Cl. ........................ 370/331; 455/436; 455/442
(58) Field of Search ................................. 370/331, 332, 370/333, 334, 335, 248, 249, 250, 349, 389; 455/436, 442

(56) References Cited

FOREIGN PATENT DOCUMENTS

| CH | 682867 A5 | 11/1993 |
|---|---|---|
| EP | 0 509 548 A | 10/1992 |
| EP | 0 777 397 A2 | 6/1997 |

*Primary Examiner*—Alpus H. Hsu
*Assistant Examiner*—Thien Tran
(74) *Attorney, Agent, or Firm*—Olson & Hierl, Ltd.

(57) ABSTRACT

A communication scheme capable of guaranteeing the order of packets in the communication media exchange during the communication so as to be able to continue the communication smoothly even after the communication media exchange is disclosed. The source host transmits a first check packet through the first communication path and stops transmission of user data packets upon transmitting the first check packet, while the destination host transmits the first check packet through the second communication path upon receiving the first check packet through the first communication path while transmitting a second check packet through the first communication path, and stops transmission of user data packets upon transmitting the second check packet. Then, the source host starts transmission of user data packets through the second communication path upon receiving the first check packet through the second communication path, while the destination host starts transmission of user data packets through the second communication path upon receiving the second check packet through the second communication path.

15 Claims, 5 Drawing Sheets

COMMUNICATION SCHEME USING CHECK PACKETS FOR GUARANTEEING DATA PACKET ORDER IN COMMUNICATION MEDIA EXCHANGE DURING COMMUNICATION

BACKGROUND OF THE INVENTION

1. Field of the Invention

The present invention relates to a technique for enabling exchange of communication media to be utilized during communication smoothly without interrupting communication.

2. Description of the Background Art

Conventionally, a technique for carrying out exchange of communication media by guaranteeing an order of packets during communication has not been considered in a system in which the communication is to be continued while appropriately exchanging mutually different communication networks according to various conditions.

As a method for guaranteeing an order of packets in general, an example in the case of cellular phone system is shown in FIG. 1, where the closest base station changes as A, B, C in conjunction with a move of the cellular phone. Here, it is assumed that initially packets are reaching from a base station A to the cellular phone. The cellular phone moves while carrying out communication, and the closest base station is changed to B. At this point, the order of packets is guaranteed as packets are transferred from the base station A to the base station B. Moreover, in the case where the cellular phone moves and the closest base station is changed to C, the order is guaranteed as packets are successively transferred from the base station A to the base station B, and from the base station B to the base station C. This method certainly can guarantee the order of packets, but this method also causes a waste in the communication path in conjunction with a move of the cellular phone, so that this method is going to consume communication facilities wastefully.

On the other hand, as a technique capable of exchanging communication media during communication, the Mobile IP is known, but the exchange of communication media that guarantees the packet order has not been considered in the Mobile IP, and the processing of an upper layer than the IP layer is held responsible for guaranteeing the packet order in the Mobile IP.

Now, when it becomes possible to simultaneously establish two communication paths using different communication media, at a time of exchanging the communication media to be utilized during communication, it becomes necessary to guarantee the order of packets that are being exchanged and to carry out the exchange at a timing where no packets exist on communication paths between hosts that are carrying out the communication, in order to continue the communication smoothly even after the communication media to be utilized are exchanged.

SUMMARY OF THE INVENTION

It is therefore an object of the present invention to provide a communication scheme capable of guaranteeing the order of packets to be exchanged in the communication while carrying out the exchange of communication media to be utilized at a timing where no packets exist on communication paths between communicating hosts, so as to be able to continue the communication smoothly even after the communication media to be utilized are exchanged.

According to one aspect of the present invention there is provided a method for exchanging communication media during a communication between a source host and a destination host in a communication system, the method comprising the steps of: (a) establishing a second communication path using a new communication medium to which the communication is to be exchanged between the source host and the destination host while carrying out the communication through a first communication path using an original communication medium; (b) transmitting from the source host to the destination host a first check packet through the first communication path, and stopping transmission of user data packets from the source host upon transmitting the first check packet; (c) transmitting from the destination host to the source host the first check packet through the second communication path upon receiving the first check packet through the first communication path while transmitting a second check packet through the first communication path, and stopping transmission of user data packets from the destination host upon transmitting the second check packet; (d) transmitting from the source host to the destination host the second check packet through the second communication path upon receiving the second check packet through the first communication path; (e) starting transmission of user data packets from the source host to the destination host through the second communication path upon receiving the first check packet through the second communication path; (f) starting transmission of user data packets from the destination host to the source host through the second communication path upon receiving the second check packet through the second communication path; and (g) disconnecting the first communication path between the source host and the destination host when the communication through the second communication path is started.

According to another aspect of the present invention there is provided a host device for carrying out a communication while exchanging communication media in a communication system, the host device comprising: a communication path management unit for establishing a second communication path using a new communication medium to which the communication is to be exchanged between the host device and a correspondent host while carrying out the communication through a first communication path using an original communication medium, and disconnecting the first communication path between the host device and the correspondent host when the communication through the second communication path is started; and a check packet processing unit for transmitting a first check packet through the first communication path to the correspondent host and stopping transmission of user data packets from the host device upon transmitting the first check packet, while transmitting a second check packet through the second communication path to the correspondent host upon receiving the second check packet through the first communication path from the correspondent host, and starting transmission of user data packets through the second communication path to the correspondent host upon receiving the first check packet through the second communication path from the correspondent host.

According to another aspect of the present invention there is provided a host device for carrying out a communication while exchanging communication media in a communication system, the host device comprising: a communication path management unit for establishing a second communication path using a new communication medium to which the communication is to be exchanged between the host device and a correspondent host while carrying out the communication through a first communication path using an original communication medium, and disconnecting the first communication path between the host device and the correspondent host when the communication through the second communication path is started; and a check packet processing unit for transmitting a first check packet through the second communication path to the correspondent host upon receiving the first check packet through the first communication path from the correspondent host while transmitting a second check packet through the first communication path to the correspondent host, stopping transmission of user data packets from the host device upon transmitting the second check packet, and starting transmission of user data packets through the second communication path to the correspondent host upon receiving the second check packet through the second communication path from the correspondent host.

Other features and advantages of the present invention will become apparent from the following description taken in conjunction with the accompanying drawings.

DETAILED DESCRIPTION OF THE PREFERRED EMBODIMENTS

Referring now to FIG. 2 to FIG. 6, one embodiment of the communication scheme according to the present invention will be described in detail.

In short, in order to estimate a timing for exchanging communication media to be utilized during communication, the present invention introduces packets called check packets that have roles for guaranteeing the order of data packets and confirming that no packets are staying on the communication paths between communicating hosts, separately from data packets that are exchanged by users.

Figure 1:
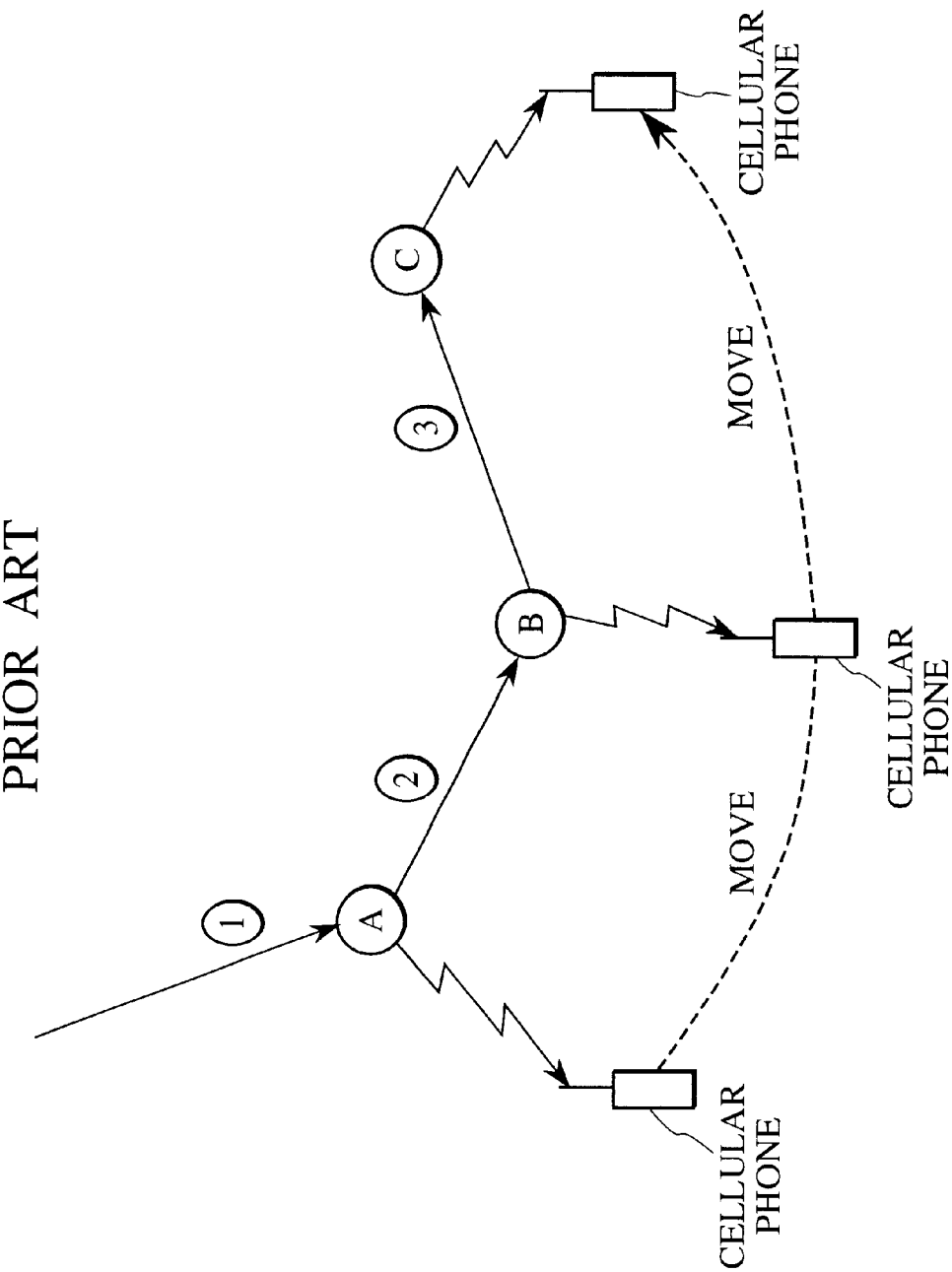
FIG. 1 is a schematic diagram for explaining a conventional method for guaranteeing an order of packets in a cellular phone system.
Figure 2:
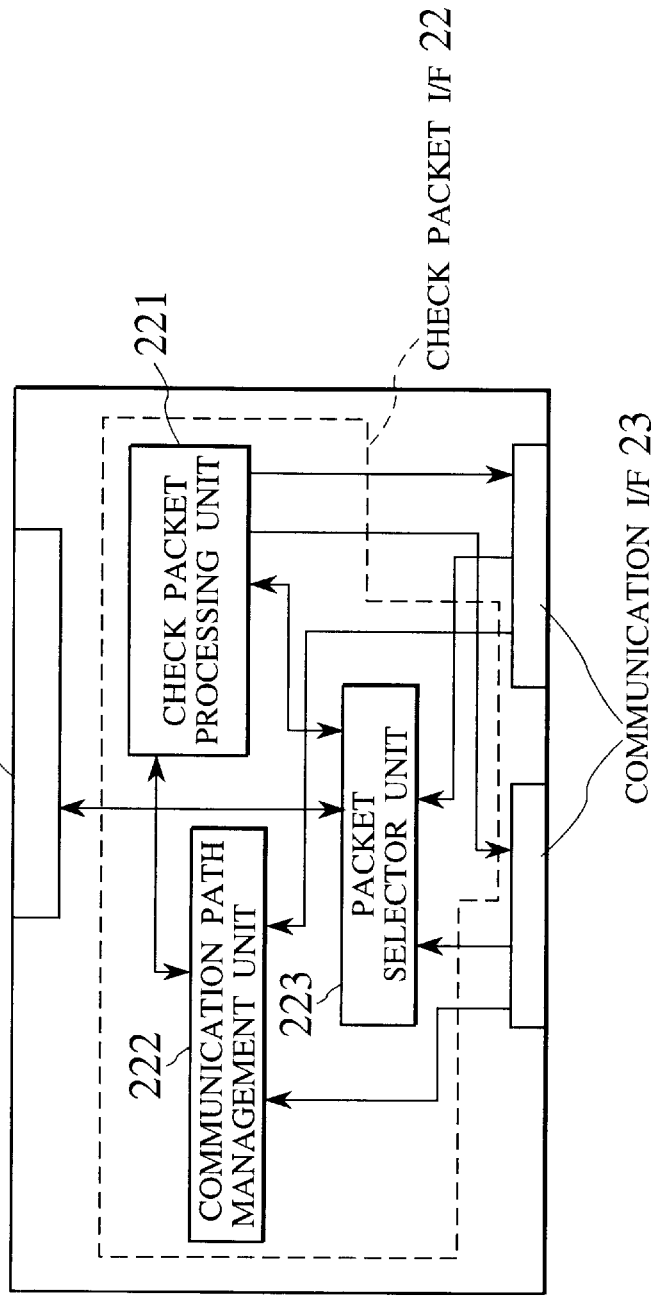
FIG. 2 is a block diagram showing an exemplary configuration of a check packet interface according to one embodiment of the present invention.

Then, as shown in FIG. 2, a check packet interface 22 is formed in a device having an upper layer interface 21 and a plurality of communication interfaces 23, from a check packet processing unit 221 having a function for generating or processing check packets received from a physical layer, a communication path management unit 222 for managing a currently used communication path and a new communication path to be exchanged for each correspondent, and a packet selector unit 223 capable of identifying check packets.

This check packet interface 22 is provided at a portion which is receiving user data from a communication interface, carrying out processing, and sending them to an appropriate upper level interface, and is operated in the case where the received packet is the check packet and in the case where a communication media exchange request is received from a user after a new communication path is established, for the purpose of producing the check packets.

Apart from these cases, this check packet interface 22 simply transmits packets between appropriate upper layer interface 21 and appropriate communication interface 23.

Now, the check packet generation in this check packet interface 22 will be described.

When the communication media exchange request is received from the user, a message commanding generation of check packets to be exchanged with a specified host is transmitted from the packet selector unit 223 to the check packet processing unit 221, and the check packet generation processing is carried out.

Figure 3:
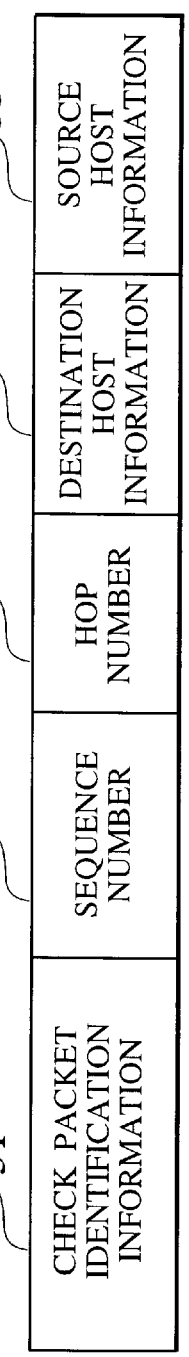
FIG. 3 is a diagram showing an exemplary format of a check packet according to one embodiment of the present invention.

Here, the check packet to be generated has a format as shown in FIG. 3, which has information for identifying the check packet includes a check packet identification information 31 indicating that this is a check packet so that it can be distinguished from user data packets, and a sequence number 32 for uniquely identifying each check packet even when a plurality of check packets are generated. In addition, in the case of method II described below, the check packet identification information also indicates whether this check packet is a packet (called trigger packet in the following) which requests the check packet generation at a correspondent host or not.

The check packet of FIG. 3 also has a field called hop number 33 which indicates the number of times for which the check packet is to be processed at a destination host. This hop number field 33 is to be decremented by one by a host indicated as a destination of the check packet at a time of receiving, processing, and transmitting this check packet. In the case of method I described below, the hop number 33 is initially set to a value 1 for the check packet to be transmitted to a currently used communication path and a value 2 for the check packet to be transmitted to a new communication path. In the case of method II described below, the hop number 33 is initially set to a value 1 for both of these check packets.

The check packet of FIG. 3 also has a destination host information 34 for indicating a destination host of the check packet and a source host information 35 for indicating a source host of the check packet, so as to specify the communication path through which the check packet is to be exchanged. These destination host information 34 and source host information 35 are given by identifiers capable of uniquely identifying hosts.

The communication path management unit 222 is managing information as to the exchange from which communication path to which communication path should be carried out for the correspondent host, and transmits the check packets to the respective communication paths according to this information.

Next, the check packet processing at the check packet interface 22 in the host that received the check packet will be described.

A packet received through the communication interface 23 is sent to the packet selector unit 223. When the received packet is the user data, it is given to appropriate upper layer interface 21. When the received packet is the check packet, it is given to the check packet processing unit 221 where check packet processing is carried out.

In either the method I or the method II, upon receiving the check packet, the check packet processing unit 221 first checks the hop number 33 of the check packet. Then, the subsequent processing is carried out in the method I and the method II respectively as follows.

Processing in Method I

When the check packet with the hop number 33 equal to 0 is received, it implies that no user data packet is staying in the communication path that has been utilized in transmitting the user data to the correspondent host, so that the received check packet with the hop number equal to 0 is not transmitted any further and discarded at the check packet processing unit 221, and the transmission of the user data to the correspondent host using a new communication path will be started.

When the check packet with the hop number 33 greater than or equal to 1 is received, it implies that the checking by the check packet operation as to whether there is any user data remaining on the communication path has not finished yet. In this case, the destination host information 34 and the source host information 35 are interchanged while the hop number 33 is decremented by one in the received packet. Then, this check packet is transmitted toward the communication interface 23 corresponding to a communication path different from that from which this check packet was just received, according to the information managed by the communication path management unit 222.

Processing in Method II

When the check packet with the hop number 33 equal to 0 is received, it implies that no user data packet is staying in the communication path that has been utilized in transmitting the user data to the correspondent host, so that the received check packet with the hop number 33 equal to 0 is not transmitted any further and discarded at the check packet processing unit 221, and the transmission of the user data to the correspondent host using a new communication path will be started.

When the check packet with the hop number 33 equal to 1 is received, it implies that the checking by the check packet operation as to whether there is any user data remaining on the communication path has not finished yet. In this case, if the check packet identification information 31 indicates that this is the trigger packet, the destination host information 34 and the source host information 35 are interchanged while the hop number 33 is decremented by one in the received packet. Then, this check packet is transmitted toward the communication interface 23 corresponding to a communication path different from that from which this check packet was just received, according to the information managed by the communication path management unit 222. In addition, another check packet with the destination host information 34 and the source host information 35 interchanged from those of the trigger packet and the hop number set equal to 1 is generated, and transmitted toward the communication path from which the trigger packet was just received, according to the information managed by the communication path management unit 222.

When the check packet with the hop number 33 equal to 1 is received but the check packet identification information 31 does not indicates that this is the trigger packet, the destination host information 34 and the source host information 35 are interchanged while the hop number 33 is decremented by one in the received packet. Then, this check packet is transmitted toward the communication interface 23 corresponding to a communication path different from that from which this check packet was just received, according to the information managed by the communication path management unit 222.

Next, the operation of the check packets will be described for an exemplary case where, starting from a state in which a host-1 and a host-2 are carrying out a communication using a communication path-1, the host-2 makes a request for exchange to a communication using a communication path-2, and the exchange is made by using the check packets. Here, again, the case of method I and the case of method II will be described separately.

Operation in Method I

1. From a state in which the communication using the communication path-1 is carried out (FIG. 4A), the host-2 newly establishes the communication path-2 toward the host-1, and requests the exchange from the communication using the communication path-1 to the communication using the communication path-2.

2. The check packets are transmitted through the following two routes from the host-2 toward the host-1 (FIG. 4B):

(1) Check Packet-1:
        Host-2 → (Communication Path-1) → Host-1 → (Communication Path-2) → Host-2;
    (2) Check Packet-2:
        Host-2 → (Communication Path-2) → Host-1 → (Communication Path-1) → Host-2 → (Communication Path-2) → Host-1.

After transmitting these check packets, the host-2 does not carry out transmission of the user data packets until the transmitted check packet-1 is received again.

Figure 4A:
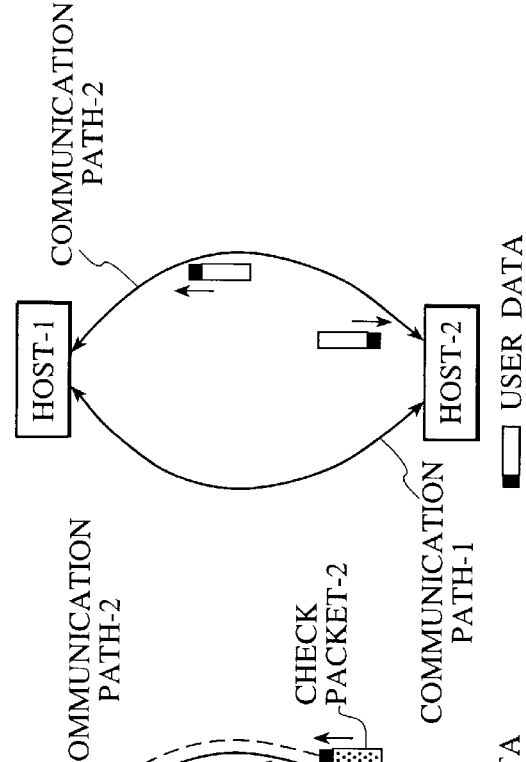
FIGS. 4A to 4C are sequential diagrams showing the operation using check packets in the method I according to one embodiment of the present invention.
Figure 4B:
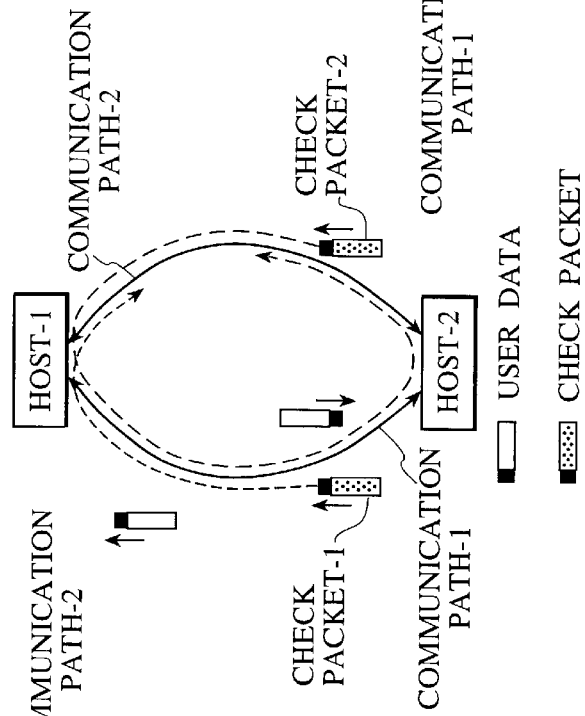
Figure 4C:
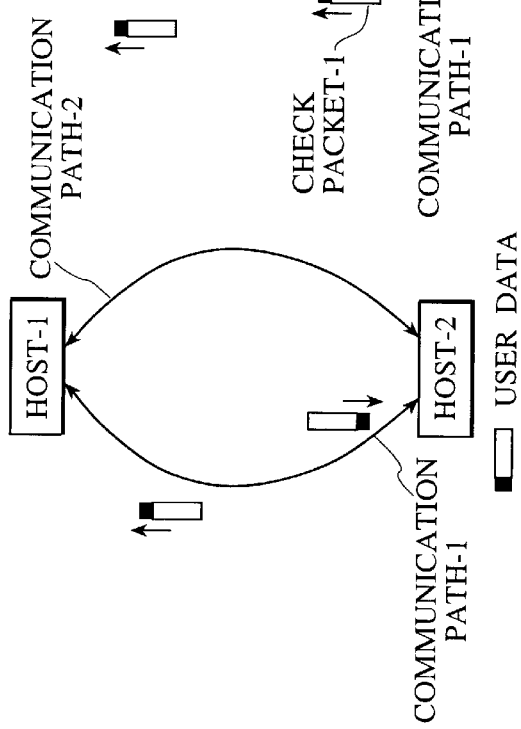

3. The host-1 transmits the received check packets toward the host-2 along the above described routes respectively. After receiving the check packet-2 and transmitting it toward the host-2, the host-1 interrupts transmission of the user data (FIG. 4B). 4. When the check packet-1 is received, the host-2 transmits the user data to the host-1 by using the communication path-2 (FIG. 4C).

5. When the check packet-2 Is received, the host-1 transmits the user data to the host-2 by using the communication path-2 (FIG. 4C).

6. The communication path-1 is then disconnected.

Note that the steps 4 and 5 may be interchanged depending on the communication condition.

By this operation, at a time of exchanging the communication paths, there is completely no user data packets that are staying on the communication path between hosts, and the order of packets that are being exchanged can be guaranteed.

Operation in Method II

1. From a state in which the communication using the communication path-1 is carried out (FIG. 5A), the host-2 newly establishes the communication path-2 toward the host-1, and requests the exchange from the communication using the communication path-1 to the communication using the communication path-2.

Figure 5B:
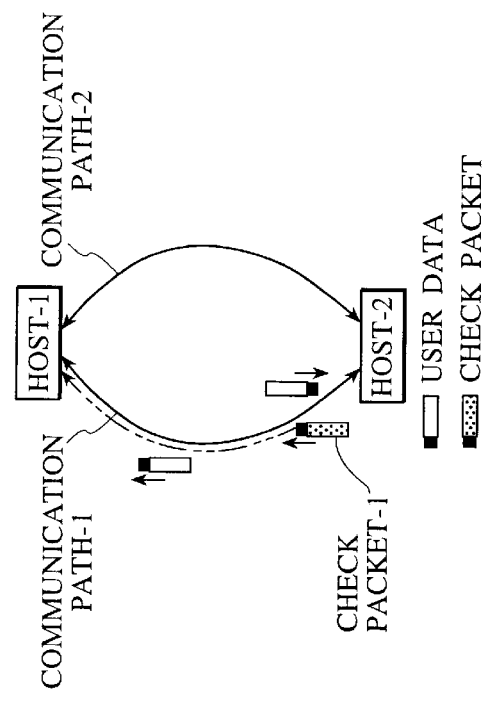
FIGS. 5A to 5D are sequential diagrams showing the operation using check packets in the method II according to one embodiment of the present invention.

2. The check packet-1 is transmitted from the host-2 toward the host-1 through the communication path-1 first (FIG. 5B). Here, the check packet identification information of the check packet-1 contains an information indicating that this is the trigger packet. After transmitting this check packet-1, the host-2 does not carry out transmission of the user data packets until the transmitted check packet-1 is received again.

Figure 5D:
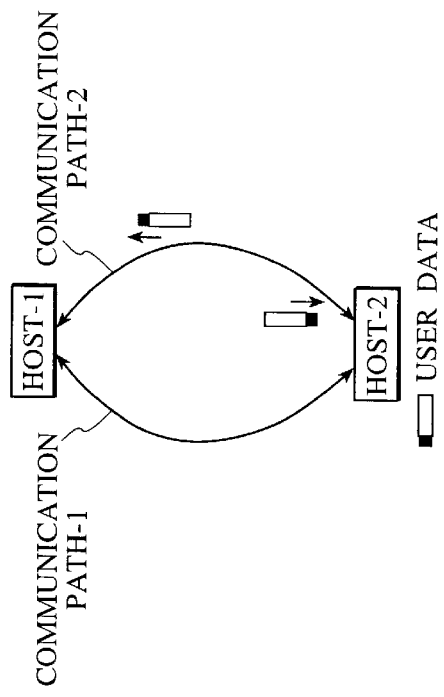
Figure 5A:
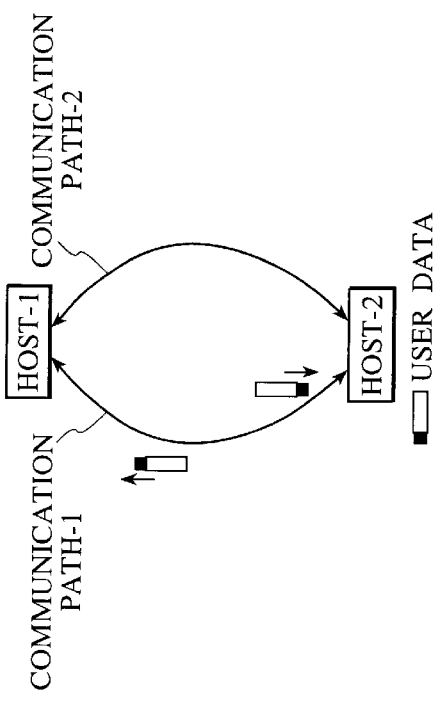
Figure 5C:
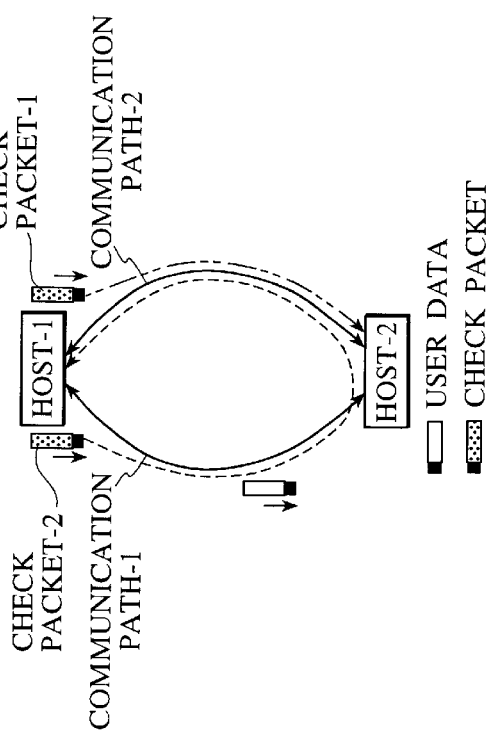

3. When the check packet-1 that is the trigger packet is received from the host-2, the host-1 carries out the processing described above. Namely, the destination host information 34 and the source host information 35 are interchanged while the hop number 33 is decremented by one in the received packet, and then this check packet-1 is transmitted toward the communication path-2 different from that from which this check packet-1 was just received (FIG. 5C). Also, another check packet-2 with the destination host information 34 and the source host information 35 interchanged from those of the trigger packet and the hop number set equal to 1 is generated, and transmitted toward the communication path-1 from which the trigger packet was just received (Fig. 5C). After generating the check packet-2 and transmitting it to the host-2 through the communication path-1, the host-1 interrupts transmission of the user data.

4. When the check packet-1 is received, the host-2 transmits the user data to the host-1 by using the communication path-2 (FIG. 5D).

5. When the check packet-2 is received, the host-2 carries out the processing described above. Namely, the destination host information 34 and the source host information 35 are interchanged while the hop number 33 is decremented by one in the received packet, and then this check packet-2 is transmitted to the communication path-2 different from that from which this check packet-2 was just received (Fig. 5C).

6. When the check packet-2 is received, the host-1 transmits the user data to the host-2 by using the communication path-2 (FIG. 5D).

7. The communication path-1 is then disconnected.

Note that the steps 4 and 6 may be interchanged depending on the communication condition.

By this operation, at a time of exchanging the communication paths, there is completely no user data packets that are staying on the communication path between hosts, and the order of packets that are being exchanged can be guaranteed.

Next, an exemplary adaptation of the communication scheme of the present invention to the L2 (Layer-2) integrated access scheme which enables the exchange of communication media during communication and which is capable of simultaneously establishing two different communication paths will be described for the case of method I and the case of method II separately. Note that the L2 integrated access scheme is more fully described in the commonly assigned co-pending U.S. patent application Ser. No. 09/070,123 of the applicant, which is hereby incorporated by reference.

In this case, the check packet generation and processing function described above is implemented in an L2IA (L2 Integrated Access) interface which is realizing functions of the L2 integrated access scheme.

Figure 6:
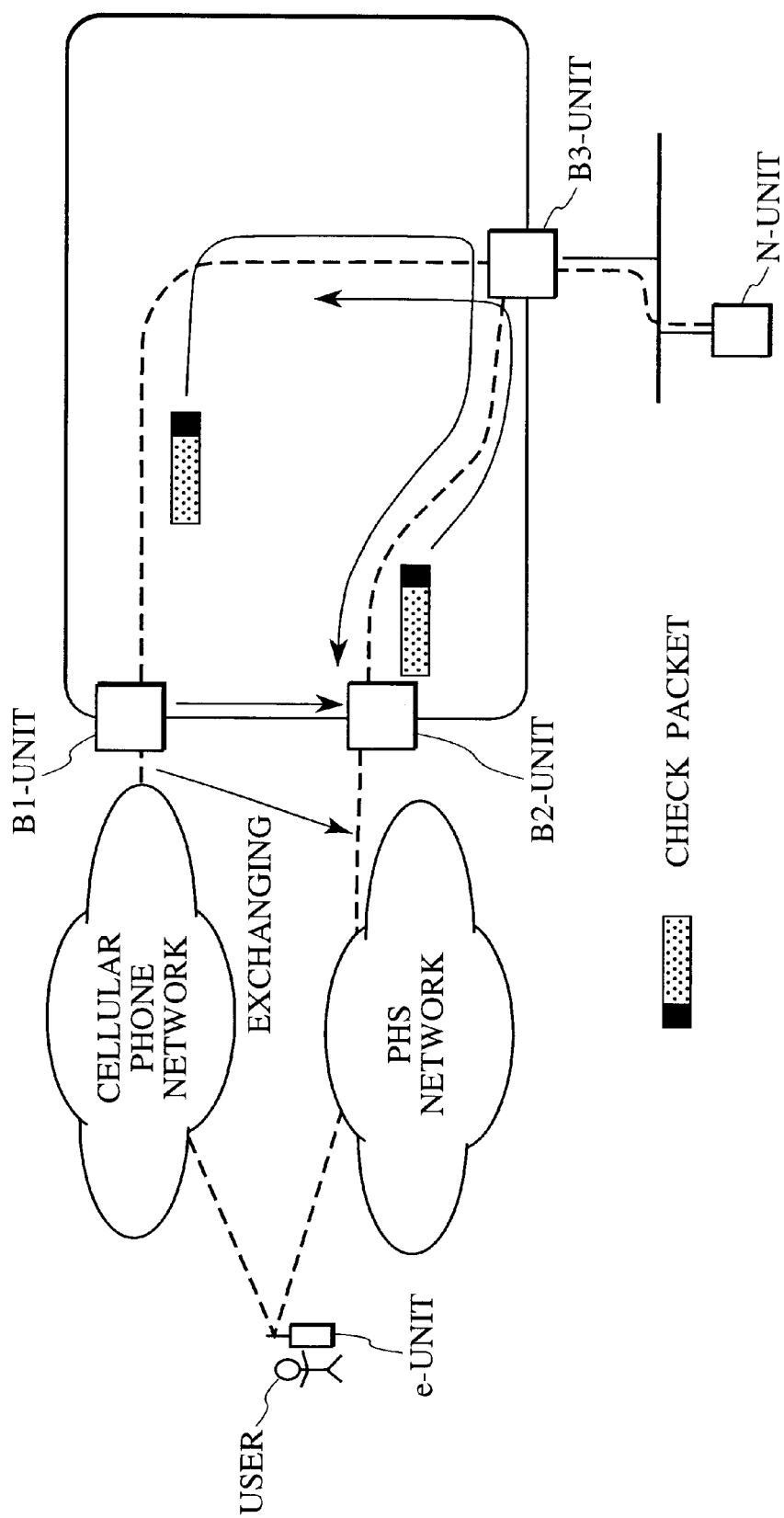
FIG. 6 is a schematic diagram of an exemplary L2 integrated access system to which the communication scheme according to the present invention is applied.

Here, as shown in FIG. 6, it is assumed that an e-unit is connected to a B1-unit by using a cellular phone and carrying out a communication with an N-unit via a B3-unit, but making a communication media exchange request so as to make a connection to a B2-unit by using a PHS (Personal Handy-phone System) and carry out the communication with the N-unit via the B3-unit.

Case of Method I (1) In a state where the communication is carried out by making a connection to the B1-unit, the exchange of communication media is requested to the B1-unit. Then, a connection to the B2-unit is newly made by using the PHS, and a communication path for transmitting the user data is established between the B3-unit and the e-unit by the functions of the L2 integrated access scheme. At this point, the B3-unit is managing information as to the exchange from which communication path to which communication path should be carried out.

(2) The e-unit transmits the check packets in two directions via the B1-unit and the B2-unit, toward the B3-unit at which the communication path is to be exchanged. Each check packet contains information on destination and source units, and the check packet transmitted via the B1-unit has the hop number set equal to 1 while the check packet transmitted via the B2-unit has the hop number set equal to 2. The hop number will be decremented by one whenever the check packet is processed at the destination unit, and the destination unit discards the received check packet with the hop number equal to 0. After transmitting these check packets, the e-unit does not carry out the transmission of the user data packets until the check packet-1 among the transmitted check packets is received again. After receiving the check packet-2, decrementing its hop number by one while interchanging its destination unit information and source unit information and transmitting it to the e-unit via the B1-unit, the B3-unit does not carry out the transmission of the user data packets until the check packet-2 is received again. The transmitted check packets pass through the following routes.

(a) Check Packet-1 e-unit → B1-unit → B3-unit → B2-unit → e-unit (b) Check Packet-2 e-unit → B2-unit → B3-unit → B1-unit → e-unit → B2-unit → B3-unit (3) When the check packet-1 is received, the e-unit discards this check packet-1 after checking that its hop number is equal to 0, and starts transmitting the user data to the e-unit by using the communication path via the B2-unit.

(4) When the check packet-2 is received again, the B3-unit discards this check packet-2 after checking that its hop number is equal to 0, and transmits the user data to the e-unit by using the communication path via the B2-unit.

(5) The communication path via the B1-unit is disconnected by the functions of the L2 integrated access scheme.

Case of Method II (1) In a state where the communication is carried out by making a connection to the B1-unit, the exchange of communication media is requested to the B1-unit. Then, a connection to the B2-unit is newly made by using the PHS, and a communication path for transmitting the user data is established between the B3-unit and the e-unit by the functions of the L2 integrated access scheme. At this point, the B3-unit is managing information as to the exchange from which communication path to which communication path should be carried out.

(2) The e-unit transmits the check packet-1 with the check packet identification information indicating that this is the trigger packet via the B1-unit toward the B3-unit at which the communication path is to be exchanged. This check packet-1 has the hop number equal to 1 and contains information on destination and source units. After transmitting this check packet-1, the e-unit does not carry out the transmission of the user data packets until this check packet-1 is received again.

(3) The B3-unit receives the check packet-1 and carries out the check packet processing. Namely, the hop number is decremented by one while the destination unit information and the source unit information are interchanged, and this check packet-1 is transmitted toward the e-unit via the B2-unit. Also, after checking that the check packet-1 is the trigger packet with the hop number equal to 1, the check packet-2 with the destination unit information and the source unit information interchanged and the hop number set equal to 1 is generated and transmitted to the e-unit via the B1-unit. After transmitting this check packet-2, the B3-unit does not carry out the transmission of the user data packets until this check packet-2 is received again.

(4) When the check packet-1 is received, the e-unit discards this check packet-1 after checking that its hop number is equal to 0, and starts transmitting the user data to the e-unit by using the communication path via the B2-unit.

(5) When the check packet-2 is received again, the B3-unit discards this check packet-2 after checking that its hop number is equal to 0, and transmits the user data to the e-unit by using the communication path via the B2-unit.

(6) The communication path via the B1-unit is disconnected by the functions of the L2 integrated access scheme.

By the above described procedures, the exchange of communication paths due to the exchange of communication media to be utilized can be realized while completely eliminating packets that are staying on the communication paths between hosts and guaranteeing the order of user data packets that are being exchanged.

As described, according to the present invention, it is possible to exchange the communication path smoothly, while securing the order of packets that are being exchanged and suppressing the loss or the like of the user data due to the exchange of communication media to be utilized.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for exchanging communication media during a communication between a source host and a destination host in a communication system, the method comprising the steps of:

(a) establishing a second communication path using a new communication medium to which the communication is to be exchanged between the source host and the destination host while carrying out the communication through a first communication path using an original communication medium;

(b) transmitting from the source host to the destination host a first check packet through the first communication path, and stopping transmission of user data packets from the source host upon transmitting the first check packet;

(c) transmitting from the destination host to the source host the first check packet through the second communication path upon receiving the first check packet through the first communication path while transmitting a second check packet through the first communication path, and stopping transmission of user data packets from the destination host upon transmitting the second check packet;

(d) transmitting from the source host to the destination host the second check packet through the second communication path upon receiving the second check packet through the first communication path;

(e) starting transmission of user data packets from the source host to the destination host through the second communication path upon receiving the first check packet through the second communication path;

(f) starting transmission of user data packets from the destination host to the source host through the second communication path upon receiving the second check packet through the second communication path; and (g) disconnecting the first communication path between the source host and the destination host when the communication through the second communication path is started.

2. The method of claim 1, wherein the source host generates the first check packet and the second check packet, and also transmits the second check packet through the second communication path to the destination host at the step (b), the destination host transmits the second check packet through the first communication path to the source host upon receiving the second check packet through the second communication path at the step (c), and the source host transmits the second check packet through the second communication path again to the destination host upon receiving the second check packet through the first communication path.

3. The method of claim 1, wherein the source host generates the first check packet at the step (b), the destination host generates the second check packet at the step (c) upon receiving the first check packet through the first communication path.

4. The method of claim 3, wherein the source host generates the first check packet containing an information for requesting a generation of the second check packet to the destination host at the step (b), such that the destination host generates the second check packet at the step (c) in response to said information.

5. The method of claim 1, wherein each one of the first check packet and the second check packet contains a hop number, and the destination host decrements the hop number of the first check packet upon receiving the first check packet through the first communication path before transmitting the first check packet through the second communication path at the step (c), and the source host decrements the hop number of the second check packet upon receiving the second check packet through the first communication path before transmitting the second check packet through the second communication path at the step (d), such that the source host discards the first check packet at the step (e) according to the hop number of the first check packet received through the second communication path and the destination host discards the second check packet at the step (f) according to the hop number of the second check packet received through the second communication path.

6. A host device for carrying out a communication while exchanging communication media in a communication system, the host device comprising:

a communication path management unit for establishing a second communication path using a new communication medium to which the communication is to be exchanged between the host device and a correspondent host while carrying out the communication through a first communication path using an original communication medium, and disconnecting the first communication path between the host device and the correspondent host when the communication through the second communication path is started; and a check packet processing unit for transmitting a first check packet through the first communication path to the correspondent host and stopping transmission of user data packets from the host device upon transmitting the first check packet, while transmitting a second check packet through the second communication path to the correspondent host upon receiving the second check packet through the first communication path from the correspondent host, and starting transmission of user data packets through the second communication path to the correspondent host upon receiving the first check packet through the second communication path from the correspondent host.

7. The host device of claim 6, wherein the check packet processing unit generates the first check packet and the second check packet, transmits the second check packet through the second communication path to the correspondent host while transmitting the first check packet, and transmits the second check packet through the second communication path again to the correspondent host upon receiving the second check packet through the first communication path from the correspondent host.

8. The host device of claim 6, wherein the check packet processing unit generates the first check packet, while the correspondent host generates the second check packet upon receiving the first check packet through the first communication path.

9. The host device of claim 8, wherein the check packet processing unit generates the first check packet containing an information for requesting a generation of the second check packet to the correspondent host, such that the correspondent host generates the second check packet in response to said information.

10. The host device of claim 6, wherein the second check packet contains a hop number, and the check packet processing unit decrements the hop number of the second check packet upon receiving the second check packet through the first communication path before transmitting the second check packet through the second communication path, such that the correspondent host discards the second check packet upon receiving the second check packet through the second communication path according to the hop number of the second check packet received through the second communication path.

11. A host device for carrying out a communication while exchanging communication media in a communication system, the host device comprising:

a communication path management unit for establishing a second communication path using a new communication medium to which the communication is to be exchanged between the host device and a correspondent host while carrying out the communication through a first communication path using an original communication medium, and disconnecting the first communication path between the host device and the correspondent host when the communication through the second communication path is started; and a check packet processing unit for transmitting a first check packet through the second communication path to the correspondent host upon receiving the first check packet through the first communication path from the correspondent host while transmitting a second check packet through the first communication path to the correspondent host, stopping transmission of user data packets from the host device upon transmitting the second check packet, and starting transmission of user data packets through the second communication path to the correspondent host upon receiving the second check packet through the second communication path from the correspondent host.

12. The host device of claim 11, wherein the check packet processing unit transmits the second check packet through the first communication path to the correspondent host upon receiving the second check packet through the second communication path from the correspondent host.

13. The host device of claim 11, wherein the check packet processing unit generates the second check packet upon receiving the first check packet through the first communication path from the correspondent host, while the correspondent host generates the first check packet.

14. The host device of claim 13, wherein the check packet processing unit generates the second check packet in response to an information for requesting a generation of the second check packet to the host device which is contained in the first check packet generated by the correspondent host.

15. The host device of claim 11, wherein the first check packet contains a hop number, and the check packet processing unit decrements the hop number of the first check packet upon receiving the first check packet through the first communication path before transmitting the first check packet through the second communication path, such that the correspondent host discards the first check packet upon receiving the first check packet through the second communication path according to the hop number of the first check packet received through the second communication path.

* * * * *